(12) United States Patent
Sawada et al.

(10) Patent No.: US 7,236,448 B2
(45) Date of Patent: Jun. 26, 2007

(54) OPTICAL INFORMATION RECORDING MEDIUM AND INFORMATION RECORDING METHOD USING THE RECORDING MEDIUM

(75) Inventors: Yasuo Sawada, Machida (JP); Yasuhide Fujiwara, Atsugi (JP)

(73) Assignee: Ricoh Company, Ltd., Tokyo (JP)

(*) Notice: Subject to any disclaimer, the term of this patent is extended or adjusted under 35 U.S.C. 154(b) by 536 days.

(21) Appl. No.: 10/238,698

(22) Filed: Sep. 10, 2002

(65) Prior Publication Data

US 2003/0048735 A1 Mar. 13, 2003

(30) Foreign Application Priority Data

Sep. 10, 2001 (JP) .............................. 2001-273643

(51) Int. Cl.
*G11B 7/00* (2006.01)
(52) U.S. Cl. .................................................. 369/275.4
(58) Field of Classification Search ............ 369/44.13, 369/275.3, 47.27, 44.26, 53.2, 275.2, 275.4
See application file for complete search history.

(56) References Cited

U.S. PATENT DOCUMENTS

| | | | |
|---|---|---|---|
| 4,266,141 A | 5/1981 | Hirakura et al. | 250/564 |
| 4,369,733 A | 1/1983 | Hirakura et al. | 118/691 |
| 4,389,972 A | 6/1983 | Hirakura et al. | 118/691 |
| 4,690,861 A | 9/1987 | Nakamura et al. | 428/623 |
| 4,797,331 A | 1/1989 | Watada et al. | 428/694 |
| 4,839,226 A | 6/1989 | Sawada et al. | 428/336 |
| 5,316,814 A | 5/1994 | Sawada et al. | 428/64 |
| 5,696,758 A | 12/1997 | Yanagimachi et al. | |
| 6,137,769 A | 10/2000 | Sawada et al. | 369/275.3 |
| 6,310,854 B1* | 10/2001 | Sato et al. | 369/275.3 |
| 6,396,798 B1* | 5/2002 | Takemura et al. | 369/275.3 |
| 6,580,678 B2* | 6/2003 | Kondo et al. | 369/275.2 |
| 6,906,993 B2* | 6/2005 | Wang et al. | 369/275.3 |
| 7,102,986 B2* | 9/2006 | Moribe et al. | 369/275.3 |

FOREIGN PATENT DOCUMENTS

| | | |
|---|---|---|
| EP | 0762392 | 3/1997 |
| EP | 1058242 | 12/2000 |
| JP | 242652 | 2/1990 |
| JP | 536087 | 2/1993 |
| JP | 9138977 | 5/1997 |
| JP | 2001-209975 A | 8/2001 |

OTHER PUBLICATIONS

Pat. Abstracts of Japan, vol. 17, No. 281(P-1548)(May 31,1993), abstract of JP 05-012680, Jan. 22, 1993.
Pat. Abstracts of Japan, vol. 18, No. 379(P-1771)(Jul. 15, 1994), abstract of JP 06-103611, Apr. 15, 1994.
Pat. Abstracts of Japan, vol. 2000, No. 25 (Apr. 12, 2001), abstract of JP 2001-209975, Aug. 3, 2001.
U.S. Appl. No. 06/932,290, filed Nov. 19, 1986, claims, abstract, drawings only.
U.S. Appl. No. 10/005,967, filed Nov. 12, 2001.

* cited by examiner

*Primary Examiner*—Nabil Hindi
(74) *Attorney, Agent, or Firm*—Cooper & Dunham LLP

(57) ABSTRACT

An optical information recording medium including a ROM region in which pits are previously formed at a track pitch (P); and a RAM region including a groove which is to be exposed to laser light to form at least one of a pit and a mark therein and to record information to be reproduced, wherein the pits in the ROM region are wobbled in a radius direction of the recording medium, a wobbling inter-pit groove is formed along the wobbled pits, wherein the width (W) of the inter-pit groove is narrower than that of the groove in the RAM region. The ratio (W/P) of the width (W) of the inter-pit groove to the track pitch (P) is preferably from 0.2 to 0.4.

16 Claims, No Drawings

OPTICAL INFORMATION RECORDING MEDIUM AND INFORMATION RECORDING METHOD USING THE RECORDING MEDIUM

BACKGROUND OF THE INVENTION

1. Field of the Invention

The present invention relates to an optical information recording medium in which information is recorded using laser light and the recorded information is reproduced by irradiating the recording medium with laser light and receiving the reflected light. More particularly, the present invention relates to a hybrid optical recording medium which has a ROM region in which data are preliminarily recorded by mastering and one of a recordable region in which additional information can be recorded and a recordable/erasable region in which information can be repeatedly recorded and erased. In addition, the present invention also relates to an information recording method using the information recording medium.

2. Discussion of the Related Art

In optical information recording media, information is recorded as follows:
(1) binarized digital data are recorded by forming concavo-convex pits on a spiral truck or concentric tracks (ROM discs) by embossing or the like;
(2) binarized digital data are recorded by forming pits in an inorganic or organic recording layer (recordable optical discs); and
(3) binarized digital data are recorded utilizing crystal changes of a recording layer (phase change optical discs).

When the recorded data are reproduced, a laser beam irradiates the track to receive the reflection light. The difference in strength of the reflection light is detected to reproduce the recorded data (i.e., to obtain the reproduced signals).

ROM discs, such as CDs, CD-ROMs and DVD-ROMs, in which information has been recorded, can be mass-produced at a low cost by transferring the concavo-convex pits formed on an original disc, to a plate. Such ROM discs are used for the distribution purpose. The concavo-convex pits can be formed on an original disc, for example, by the following method:
(1) a resist is formed on a glass plate or the like substrate;
(2) a laser light irradiates the resist to form a latent image; and
(3) the latent image is developed to form the concavo-convex pits on the glass plate.

In the above-mentioned recordable optical discs and phase change optical discs, such as CD-Rs, CD-RWs, DVD-Rs, DVD-RW, DVD+Rs and DVD+RWs, information recording is performed as follows:
(1) guide grooves for tracking are formed on a substrate by transferring the guide grooves formed on an original plate similarly to the method as mentioned above for use in the ROM discs;
(2) a recording material such as an inorganic or organic recording layer is formed on the substrate having guide grooves thereon; and
(3) information is recorded in the recording layer using a recording/reproducing apparatus such as CD-R drives.

It is required for the recordable discs such as recordable discs and phase change optical discs to reproduce the recorded information under the same reproducing conditions as those of ROM discs, i.e., information has to be reproduced similarly to the cases of CD-ROMs and CD-Rs (or CD-RWs), and DVD-ROMs and DVD-Rs (or DVD-RWs, DVD+Rs and DVD+RWs). This requirement can be fulfilled when the following is satisfied:
(1) information has to be recorded in recordable optical discs in the same format as that of ROM discs; and
(2) recorded signals to be reproduced have almost the same reproduction properties as those of ROM discs.

In the above-mentioned CD-Rs etc., address information is recorded in wobbled guide grooves, and recording pits, which are signals to be reproduced and which are similar to the pits of ROM discs, are formed by a recording drive.

ROM discs, which have both a recordable region and a ROM region therein, are called hybrid optical discs. The hybrid optical discs can be prepared by an injection method using a stamper. Therefore the hybrid optical discs can be easily mass-produced at a low cost. In addition, since the hybrid optical discs have a recordable region, mass-produced ROM data can be renewed and recordable media having software for controlling drives can be realized.

The present invention can be applied to hybrid optical discs (i.e., hybrid CD-R discs, hybrid CD-RW discs, hybrid DVD-R discs, hybrid DVD+R discs, hybrid DVD-RW discs and hybrid DVD+RW discs). In particular, the present invention is suitably applied to hybrid CD-R discs and hybrid CD-RW discs.

Japanese Patent Publication No. 7-114028 (i.e., Japanese Laid-Open Patent Publication No. 2-42652) discloses a hybrid CD-R medium having on the same plane both a ROM region including pits prepared by mastering and a recordable region formed on a groove portion. In the CD-R medium, the constitution of the ROM region is the same as that of normal CDs, and a reflection layer is directly formed on the pits of the substrate. However, it is difficult to selectively coat a dye on the groove portion without coating the dye on the ROM region. In addition, it is further difficult to coat a dye inside the ROM region. Therefore, a dye is coated on both the pit portion and groove portion while the pit form, groove form and dye coating conditions are optimized so that the signal characteristics of the pit portion and groove portion are optimized.

However, the push-pull signals from the ROM region are signals only output from the intermittent prepits, and the signals are much weaker than the push-pull signals (non-recorded signals), which are output from a continuous groove. Therefore, even when the modulation and push-pull amplitude (i.e., PPA), which are specified in the Orange Book, are fulfilled, the variation (hereinafter referred to as the in-plane variation) of the signals, push-pull/Ig (for a non-recorded portion) and push-pull/Iga (for the ROM region, i.e., recorded region) which are used for the tracking servo of recording apparatus, in each plane of the three zones often fall out of the range of ±3 dB (i.e., about ±40%). At this point, the three zones mean "the ROM region", "a recorded portion of the RAM region" and "a non-recorded portion of the RAM region". In particular, a problem which occurs is that tracking is not well performed by a drive in which the basic servo gain is set on the basis of the gain at the inner ROM region.

In addition, since the push-pull signals are weak in the ROM region, the wobble signals are also weak, resulting in occurrence of a problem in that ATIP (Absolute Time In Pre-groove) information cannot be read.

In order to solve this problem, it is known that an inter-pit groove is formed at a location between pits along the pit lines in the ROM region.

Japanese Laid-Open Patent Publication No. 5-36087 discloses an optical medium in which a wobbling groove (i.e., an inter-pit groove) which has the same form as that of a RAM groove is formed along the wobbling pits line in the ROM region. In this case, when the width of the RAM groove is set so as to be the same as the width of the inter-pit grooves, interference between the pits and the inter-pit grooves becomes large in an original plate preparation process, resulting in occurrence of sagging of the front and rear portions of the pits, and thereby a problem occurs in that the jitter at the ROM region becomes large. In addition, when the width of the inter-pit grooves is too narrow, a problem in that the wobble jitter becomes large occurs.

Japanese Laid-Open Patent Publication No. 9-138997 discloses an optical disc in which wobbling inter-pit grooves are formed to improve the characteristics of ATIP signals. However, the pits are not wobbled to lower the jitter at the ROM region. When an original plate of such an optical disc is prepared, two light beams are needed for forming the pits and inter-pit grooves. Therefore, the light irradiator used for forming the original plate has a complex optical device, and in addition, it is very hard to adjust the positions of the two light beams, i.e., it is hard to produce an original plate. Further, when the pits are not wobbled, a problem in that the wobble jitter becomes large occurs.

SUMMARY OF THE INVENTION

Accordingly, an object of the present invention is to provide an optical information recording medium which has small in-plane variation of tracking servo signals (i.e., has stable servo characteristics), improved jitter characteristics at the ROM region and small wobble jitter characteristics and which can securely reproduce ATIP information while being well matched with various drives.

To achieve such an object, the present invention contemplates the provision of an optical information recording medium including a ROM region in which pits are formed at a track pitch (P) and a RAM region including a groove which is to be exposed to laser light to form a pit or a mark therein and to record information to be reproduced, wherein the pits in the ROM region are wobbled in a radius direction of the recording medium, an inter-pit groove is formed along the wobbled pits, and wherein the width (W) of the inter-pit groove is narrower than the width of the groove in a RAM region. The ratio (W/P) of the width (W) of the inter-pit groove to the track pitch (P) is preferably from 0.2 to 0.4.

The optical information recording medium is a medium selected from the group consisting of recordable CDs (i.e., (CD-Rs) and rewritable CDs (i.e., CD-RWs).

In the another aspect of the present invention, an information recording method is provided which includes:

providing an optical information recording medium including a ROM region in which pits are formed at a track pitch (P), and a RAM region including a groove; and forming at least one of a pit and a mark in the groove in the RAM region of the optical information recording medium and to record information, wherein the optical information recording medium is the optical information recording medium mentioned above.

The pit/mark forming step is preferably performed by applying light irradiation to a groove in a RAM region.

These and other objects, features and advantages of the present invention will become apparent upon consideration of the following description of the preferred embodiments of the present invention.

DESCRIPTION OF THE PREFERRED EMBODIMENTS

The optical information recording medium (hereinafter sometimes referred to as the recording medium) of the present invention will be explained in detail.

By forming an inter-pit groove, the push-pull signals generated by the inter-pit groove are added to the push-pull signals generated by pits. Therefore, the difference between the push-pull/Iga (hereinafter PP/Iga) at the ROM region and the push-pull/Ig (hereinafter PPb/Ig, non-recorded portion) at the RAM region decreases. In addition, the difference between the push-pull/Iga (hereinafter PP/Iga) at the ROM region and the push-pull/Ig (hereinafter PPa/Iga, recorded portion) at the RAM region also decreases. Thereby the servo characteristics can be improved.

The form of the junctions between the pits and the inter-pit groove is influenced more easily than in the case in which only the pits are formed. This is because the light beam used for forming pits overlaps with the light beam used for forming the inter-pit groove.

In order to obtain strong push-pull signals at the ROM region, it is needed to narrow the interval between the light beam pulses applied to the pit part and inter-pit groove or to continuously apply light beam pulses. However, in this case the light beams seriously overlaps with each other, resulting in sagging of the front and rear portions of the pits, and thereby the jitter characteristics deteriorate. As the width of the inter-pit groove becomes large, the strength of the light beam used for forming the inter-pit groove needs to be increased. Therefore, the light beams seriously overlaps with each other, resulting in further increase of jitter.

In addition, when the width of the inter-pit groove is too long, the maximum reflectance (i.e., Rtop) of the recording signals decreases and falls out of the specification of the Orange Book.

In order to decrease the difference between the signal characteristics of the ROM region and those of the RAM region, it is preferable that the width of the inter-pit groove is the same as that of the groove in the RAM region at the maximum reflectance (i.e., Rtop) of the recording signals if the depths thereof are the same. However, in view of the jitter characteristics at the ROM region, the narrower the width of the inter-pit groove, the better the jitter characteristics.

The wobble signals are very important signals influencing the disc characteristics. When the width of the inter-pit groove is narrow, the wobble signal jitter increases, resulting in deterioration of matching properties of the recording medium with drives.

Therefore, it is preferable that the width of the inter-pit groove falls in a specific range. As a result of the present inventors' investigation, it is found that the ratio (W/P) of the width (W) of the inter-pit groove to the track pitch (P) is preferably from 0.2 to 0.4. In particular, the ratio (W/P) is more preferably from 0.25 to 0.35, and even more preferably from 0.25 to 0.30, in view of the matching properties of the recording medium with drives.

The width of the RAM groove formed on the substrate is from 0.4 to 0.7 μm for normal CD-Rs. The width of the inter-pit groove is from 0.30 to 0.65 μm, and preferably from 0.40 to 0.50 μm.

The depths of the RAM groove and the inter-pit groove are typically from 1200 to 2200 Å when used for CD-Rs. The depths are almost the same as those of the normal CD-Rs. In this case, it is preferable that the depths of the RAM groove and the inter-pit groove are the same because an original plate of the recording medium can be easily prepared as mentioned above.

The depth of the pits in the ROM region is preferably from 2500 to 3500 Å to obtain the modulation specified in the Orange Book and the push-pull signals mentioned above.

The method of forming ROM pits, inter-pit grooves and RAM grooves in an original plate is similar to the method of forming an original CD-R disc, and is as follows. For example, a photo-resist layer is formed on an glass plate; and light irradiates the photo-resist layer while changing the intensity thereof to form deep ROM pits, and shallow inter-pit grooves and RAM grooves.

However, in order to control the variation of the depth of the inter-pit groove and RAM groove so as to be small, two-layer type photo-resist layer having an intermediate layer therein is preferably formed on a glass plate. When ROM pits are formed, laser light having a strong laser power of from 4.0 mW to 5.0 mW irradiates the photo-resist layer. When the inter-pit grooves and RAM grooves are formed, laser light having a relatively weak laser power of from 2.0 mW to 3.5 mW irradiates the photo-resist layer such that the laser light does not reach the lower resist layer.

As the method of irradiating the photo-resist, one-beam irradiating methods in which one laser beam is used for forming ROM pits, inter-pit grooves and RAM grooves while changing its power; and plural-beam irradiating methods in which plural laser beams are used for forming ROM pits, inter-pit groove and RAM groove, can be used. However, one-beam irradiating methods are preferably used to prevent increase of jitter, which is caused by changes in irradiating position of the laser beam used for forming the ROM pits and the laser beam used for forming the inter-pit groove.

In the RAM region, by irradiating the resist layer twice with a laser beam such that two beam spots are formed on the resist layer while one of the beam spots slightly deviates from the other beam spot in the radial direction of the recording medium. Thus, a RAM groove which is wider than the inter-pit groove can be formed.

After the light irradiation process, the original glass plate is subjected to a first developing treatment, an intermediate layer etching treatment, and a second developing treatment to form the ROM pits, inter-pit grooves and RAM grooves.

The thus prepared original plate is then subjected to an electroconductive treatment followed by electroplating treatment to prepare a stamper. By using this stamper, substrates for a hybrid optical information recording medium can be prepared.

Suitable materials for use as the substrate of the hybrid optical information recording medium include polycarbonate resins, acrylic resins, epoxy resins, polystyrene resins, acrylonitrile-styrene copolymers, polypropylene resins, silicone resins, fluorine-containing resins, ABS resins, urethane resins, etc. Among these resins, polycarbonate resins and acrylic resins are preferably used in view of moldability, optical characteristics and manufacturing cost.

In order to prepare recordable hybrid optical information recording media, a light absorbing layer is formed on such a substrate as mentioned above. A dyestuff is typically coated by a spinner coating method to form the light absorbing layer. The thickness thereof is typically from 500 to 3000 Å.

Specific examples of the dyestuffs include cyanine type, phthalocyanine type, naphthalocyanine type, anthraquinone type, azo type, triphenyl methane type, pyrylium type, thiapyrylium type, squarilium type and croconium type dyes and pigments, and metal complex dyes and pigments. These dyestuffs can be used alone or in combination.

A reflection layer is directly formed on the light absorbing layer (i.e., the recording layer). Suitable materials for use in the reflection layer include metals having high reflectance such as Ag, Au and Cu, and metal alloys including one or more of the metals. The thickness of the reflection layer is preferably from 500 to 2000 Å. The reflection layer is typically formed by a method such as vapor deposition and sputtering.

It is preferable to form a protective layer on the reflection layer. The protective layer is typically formed by coating an ultraviolet crosslinking resin by a spinner coating method. The thickness of the protective layer is typically from 1 to 10 μm.

In addition, an upper protective layer may be formed on the protective layer, for example, by screen-printing an ultraviolet crosslinking resin such that the thickness of the upper protective layer is from 5 to 100 μm.

The rewritable hybrid optical information recording media typically have a constitution in which a dielectric layer (a first protective layer), a recording layer, a second dielectric layer (a second protective layer), and a reflection layer (a reflection/heat-releasing layer) are formed on a substrate in this order. In addition, it is preferable to form a protective layer on the reflection layer.

Suitable materials for use as the substrate include the materials mentioned above for use in the recordable hybrid optical information recording media. In addition, suitable materials for use in the protective layer also include the materials mentioned above for use in the recordable hybrid optical information recording media.

Phase change materials including Ag, In, Sb and Te are mainly used for the recording layer of the rewritable hybrid optical information recording media. This is because these materials have good recording sensitivity/speed (i.e., a good ability to quickly change its state from a crystalline state to an amorphous state), good erasing sensitivity/speed (i.e., a good ability to quickly change its state from an amorphous state to a crystalline state), and good erasure ratio.

In order to improve recording properties and reliability of the recording layer, other elements and impurities can be added to the recording layer. Specific examples of such elements include B, N, C, P, Si, Ge, O, S, Se, Al, Ti, Zr, V, Mn, Fe, Co, Ni, Cr, Cu, Zn, Ga, Sn, Pd, Pt, Au, etc.

The thickness of the recording layer is from 17 to 100 nm, and preferably from 17 to 30 nm.

Suitable materials for use in the first and second dielectric layers (i.e., protective layers) include metal oxides such as SiOx, ZnO, $SnO_2$, $Al_2O_3$, $TiO_2$, $In_2O_3$, MgO, $ZrO_2$, and $Ta_2O_5$; nitrides such as $Si_3N_4$, AlN, TiN, BN and ZrN; sulfides such as ZnS and $TaS_4$; and carbides such as SiC, TaC, $B_4C$, WC, TiC and ZrC. These materials can be used alone or in combination.

The thickness of the first dielectric layer is from 50 nm to 250 nm, and preferably from 75 nm to 200 nm. The thickness of the second dielectric layer is from 10 nm to 100 nm, and preferably from 15 nm to 50 nm.

Suitable materials for use in the reflection layer (i.e., the reflection/heat-releasing layer) include metals such as Al, Au, Cu, Ag, Cr, Sn, Zn, In, Pd, Zr, Fe, Co, Ni, Si, Ge, Sb, Ta, W, Ti and Pb; and metal alloys and mixtures of the metals mentioned above. The reflection layer may have a layered structure in which plural different metal (or metal alloy or metal mixture) layers are overlaid. The important function of the reflection layer is to efficiently dissipate heat. The thickness of the reflection layer is from 30 nm to 250 nm and preferably from 50 nm to 200 nm.

Having generally described this invention, further understanding can be obtained by reference to certain specific examples which are provided herein for the purpose of illustration only and are not intended to be limiting.

EXAMPLES

Example 1

On a surface of disc-form a polycarbonate substrate which has a diameter of 120 mm and a thickness of 1.2 mm, pits each having a depth of 2850 Å and a width of 0.6 µm are formed at a track pitch of 1.6 µm from the TOC (Table Of Contents) portion toward the circumference portion which is apart from the center of the disc-form substrate by 35 mm, and inter-pit grooves each of which connects any two adjacent pits of the pits and which has a depth of 1500 Å, a width of 0.4 µm and a wobble amplitude of 35 nm are formed. In this case, the ratio of the width of the inter-pit grooves to the track pitch is 0.25. Tn addition, a guide groove having a depth of 1500 Å and a width of 0.7 µm is also formed outside the pits and inter-pit grooves at a track pitch of 1.6 µm.

On the surface of the substrate, a light absorbing layer was formed by spin-coating a coating liquid including a phthalocyanine dyestuff and a mixture solvent including ethylcyclohexane as a main component. The light absorbing layer was then subjected to a heat treatment at 100° C. for 30 minutes.

In addition, a reflection layer made of Ag and having a thickness of about 1400 Å was formed on the light absorbing layer. Further, a protective layer having a thickness of about 5 µm as formed thereon by coating an ultraviolet crosslinking resin using a spinner and crosslinking the resin with ultraviolet rays.

Furthermore, an upper protective layer having a thickness of about 10 µm was formed thereon by screen printing an ultraviolet crosslinking ink.

Thus, a CD-R optical recording medium was prepared.

The optical recording medium was set in a recording/reproduction device having a pickup emitting laser light having a wavelength of 780 Å to reproduce recorded information. The results are as follows:
1. 3T jitter at ROM region: 28 ns (land)
   26 ns (pit)
2. Servo gain ratio (PP/Iga:PPb/Ig:Ppa/Iga): 1:0.78:0.98
   (recording was performed under an optimized condition)
   The requirements of ±40% in in-plane variation can be fully fulfilled.
3. Rtop at the ROM region: 70.4%
   PPA: 0.087
   11T modulation: 0.65
   3T modulation: 0.44
   Thus, the optical recording medium satisfies the requirements of the Orange Book.
4. Wobble jitter: 11.6 µs This optical medium has good matching properties with drives marketed by various manufactures.

Comparative Example 1

On a surface of a disc-form polycarbonate substrate which has a diameter of 120 mm and a thickness of 1.2 mm, pits each having a depth of 2890 Å and a width of 0.6 µm are formed at a track pitch of 1.6 µm from the TOC portion toward the circumference portion which is apart from the center of the disc-form substrate by 35 mm, and inter-pit grooves each of which connects any two adjacent pits of the pits and which has a depth of 1550 Å, a width of 0.25 µm and a wobble amplitude of 35 nm are formed. In this case, the ratio of the width of the inter-pit grooves to the track pitch is 0.16. In addition, a guide groove having a depth of 1500 Å and a width of 0.7 µm is also formed outside the pits and inter-pit grooves at a track pitch of 1.6 µm.

Then the procedures for preparation of the light absorbing layer, reflection layer, protective layer and upper protective layer in Example 1 were repeated.

Thus, a comparative CD-R optical recording medium was prepared.

The comparative optical recording medium was set in a recording/reproduction device having a pickup emitting laser light having a wavelength of 780 Å to reproduce recorded information. The results are as follows:
1. 3T jitter at ROM region: 25 ns (land)
   24 ns (pit)
2. Servo gain ratio (PP/Iga:PPb/Tg:Ppa/Iga): 1:0.83:1.04
   (recording was performed under an optimized condition)
   The requirements of ±40% in in-plane variation can be fully fulfilled.
3. Rtop at the ROM region: 71.7%
   PPA: 0.081
   11T modulation: 0.68
   3T modulation: 0.46
   Thus, the optical recording medium satisfies the requirements of the Orange Book.
4. Wobble jitter: 20.4 µs This optical medium has poor matching properties with drives marketed by various manufactures.

Example 2

On a surface of a disc-form polycarbonate substrate which has a diameter of 120 mm and a thickness of 1.2 mm, pits each having a depth of 3100 Å and a width of 0.6 µm are formed at a track pitch of 1.6 µm from the TOC portion toward the circumference portion which is apart from the center of the disc-form substrate by 35 mm, and inter-pit grooves each of which connects any two adjacent pits of the pits and which has a depth of 1650 Å, a width of 0.35 µm and a wobble amplitude of 35 nm are formed. In this case, the ratio of the width of the inter-pit grooves to the track pitch is 0.22. In addition, a guide groove having a depth of 1650 Å and a width of 0.7 µm is also formed outside the pits and inter-pit grooves at a track pitch of 1.6 µm.

Then the procedures for preparation of the light absorbing layer, reflection layer, protective layer and upper protective layer in Example 1 were repeated.

Thus, a CD-R optical recording medium was prepared.

The optical recording medium was set in a recording/reproduction device having a pickup emitting laser light having a wavelength of 780 Å to reproduce recorded information. The results are as follows:
2. 3T jitter at ROM region: 27 ns (land)
   25 ns (pit)
2. Servo gain ratio (PP/Iga:PPb/Ig:Ppa/Iga): 1:0.81:1.01
   (recording was performed under an optimized condition)
   The requirements of ±40% in in-plane variation can be fully fulfilled.
3. Rtop at the ROM region: 71.2%
   PPA: 0.083
   11T modulation: 0.72
   3T modulation: 0.47

Thus, the optical recording medium satisfies the requirements of the Orange Book.

4. Wobble jitter: 14.5 us

This optical medium has good matching properties with drives marketed by various manufactures.

Comparative Example 2

On a surface of a disc-form polycarbonate substrate which has a diameter of 120 mm and a thickness of 1.2 mm, pits each having a depth of 2910 Å and a width of 0.7 μm are formed at a track pitch of 1.6 μm from the TOC portion to circumference portion which is apart from the center of the disc-form substrate by 35 mm, and inter-pit grooves each of which connects any two adjacent pits of the pits and which has a depth of 1500 Å, a width of 0.7 μm and a wobble amplitude of 35 nm are formed. In this case, the ratio of the width of the inter-pit grooves to the track pitch is 0.44. In addition, a guide groove having a depth of 1500 Å and a width of 0.7 μm is also formed outside the pits and inter-pit grooves at a track pitch of 1.6 μm.

Then the procedures for preparation of the light absorbing layer, reflection layer, protective layer and upper protective layer in Example 1 were repeated.

Thus, a comparative CD-R optical recording medium was prepared.

The comparative optical recording medium was set in a recording/reproduction device having a pickup emitting laser light having a wavelength of 780 Å to reproduce recorded information. The results are as follows:

1. 3T jitter at ROM region: 34 ns (land)
   33 ns (pit)
   Thus, the jitter of this optical recording medium is near the limit (35 ns) of the Orange Book.
2. Servo gain ratio (PP/Iga:PPb/Ig:Ppa/Iga): 1:0.75:0.94
   (recording was performed under an optimized condition)
   The requirements of ±40% in in-plane variation can be fully fulfilled.
3. Rtop at the ROM region: 69.8%
   PPA: 0.090
   11T modulation: 0.63
   3T modulation: 0.42
   Thus, the optical recording medium satisfies the specifications of the Orange Book.
4. Wobble jitter: 9.2 μs This optical medium has good matching properties with drives marketed by various manufactures.

Example 3

On a surface of a disc-form polycarbonate substrate which has a diameter of 120 mm and a thickness of 1.2 mm, pits each having a depth of 3100 Å and a width of 0.6 μm are formed at a track pitch of 1.6 μm from the TOC portion toward the circumference portion which is apart from the center of the disc-form substrate by 35 mm, and inter-pit grooves each of which connects any two adjacent pits of the pits and which has a depth of 1650 Å, a width of 0.6 μm and a wobble amplitude of 35 nm are formed. In this case, the ratio of the width of the inter-pit grooves to the track pitch is 0.38. In addition, a guide groove having a depth of 1650 Å and a width of 0.7 μm is also formed outside the pits and inter-pit grooves at a track pitch of 1.6 μm.

Then the procedures for preparation of the light absorbing layer, reflection layer, protective layer and upper protective layer in Example 1 were repeated.

Thus, a CD-R optical recording medium was prepared.

The optical recording medium was set in a recording/reproduction device having a pickup emitting laser light having a wavelength of 780 Å to reproduce recorded information. The results are as follows:

3. 3T jitter at ROM region: 30 ns (land)
   28 ns (pit)
2. Servo gain ratio (PP/Iga:PPb/Ig:Ppa/Iga): 1:0.741:0.94
   (recording was performed under an optimized condition)
   The requirements of ±40% in in-plane variation can be fully fulfilled.
3. Rtop in the ROM region: 70.1%
   PPA: 0.089
   11T modulation: 0.64
   3T modulation: 0.43
   Thus, the optical recording medium satisfies the requirements of the Orange Book.
4. Wobble jitter: 10.4 μs This optical medium has good matching properties with drives marketed by various manufactures.

Example 4

On a surface of a disc-form polycarbonate substrate which has a diameter of 120 mm and a thickness of 1.2 mm, pits each having a depth of 1000 Å and a width of 0.65 μm are formed at a track pitch of 1.6 μm from the TOC portion toward the circumference portion which is apart from the center of the disc-form substrate by 35 mm, and inter-pit grooves each of which connects any two adjacent pits of the pits and which has a depth of 400 Å, a width of 0.4 um and a wobble amplitude of 35 nm are formed. In this case, the ratio of the width of the inter-pit grooves to the track pitch is 0.25. In addition, a guide groove having a depth of 400 Å and a width of 0.5 μm is also formed outside the pits and inter-pit grooves at a track pitch of 1.6 μm.

On the surface of the disc-form substrate, a first dielectric layer of $ZnS$—$SiO_2$, a recording layer of Ag—In—Sb—Te, a second dielectric layer of $ZnS$—$SiO_2$, and a reflection layer of Ag were formed one by one by sputtering.

In addition, a protective layer having a thickness of about 5 μm was formed thereon by spin-coating an ultraviolet crosslinking resin and crosslinking the resin with ultraviolet rays.

Furthermore, an upper protective layer having a thickness of about 10 μm was formed thereon by screen printing an ultraviolet crosslinking ink.

Thus, a CD-RW optical recording medium was prepared.

The optical recording medium was set in a recording/reproduction device having a pickup emitting laser light having a wavelength of 780 Å to reproduce recorded information. The results are as follows:

1. 3T jitter at ROM region: 24 ns (land)
   21 ns (pit)
2. Servo gain ratio (PP/Iga:PPb/Ig:Ppa/Iga): 1:0.77:0.98
   (recording was performed under an optimized condition)
   The requirements of ±40% in in-plane variation can be fully fulfilled.
3. Rtop at the ROM region: 18.5%
   PPA: 0.088
   11T modulation: 0.68
   3T modulation: 0.55
   Thus, the optical recording medium satisfies the requirements of the Orange Book.
4. Wobble jitter: 11.0 μs This optical medium has good matching properties with drives marketed by various manufactures.

As mentioned above, according to the present invention, the in-plane variation of tracking servo signals can be decreased (i.e., the servo characteristics can be stabilized) and the jitter at the ROM region can be securely improved. In addition, the wobble jitter can be decreased, and thereby the matching properties with various drives can be improved.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2001-273643, filed on Sep. 10, 2001, the entire contents of which are herein incorporated by reference.

What is claimed is:

1. An optical information recording medium comprising:
   a ROM region in which intermittent pits are formed along a line at a track pitch (P); and
   a RAM region including a groove in which at least one of a pit and a mark is to be formed to record information,
   wherein the pits in the ROM region are wobbled in a radius direction of the optical information recording medium, wherein an inter-pit groove is formed along the wobbled pits, the groove connecting adjacent pits along the line, and wherein a width (W) of the inter-pit groove is narrower than a width of the groove in the RAM region.

2. The optical information recording medium according to claim 1, wherein a ratio (W/P) of the width (W) of the inter-pit groove to the track pitch (P) is from 0.2 to 0.4.

3. The optical information recording medium according to claim 1, wherein the optical information recording medium is a CD-R.

4. The optical information recording medium according to claim 1, wherein the optical information recording medium is a CD-RW.

5. An information recording method comprising:
   providing an optical information recording medium comprising a ROM region in which intermittent pits are formed along a line at a track pitch (P), and a RAM region including a groove; and
   forming at least one of a pit and a mark in the groove in the RAM region of the optical information recording medium to record information,
   wherein the pits in the ROM region are wobbled in a radius direction of the recording medium, an inter-pit groove is formed along the wobbled pits, the groove connecting adjacent pits along the line, and wherein a width (W) of the inter-pit groove is narrower than a width of the groove in the RAM region.

6. The information recording method according to claim 5, wherein a ratio (W/P) of the width (W) of the inter-pit groove to the track pitch (P) is from 0.2 to 0.4.

7. An optical information recording method comprising:
   providing an optical information recording medium comprising a ROM region in which intermittent pits are formed along a line at a track pitch (P) and a RAM region including a groove; and
   applying light irradiation to the groove in the RAM region of the optical information recording medium to form at least one of a pit and a mark therein,
   wherein the pits in the ROM region are wobbled in a radius direction of the recording medium, an inter-pit groove is formed along the wobbled pits, the groove connecting adjacent pits along the line, and wherein a width (W) of the inter-pit groove is narrower than a width of the groove in the RAM region.

8. The optical information recording method according to claim 7, wherein a ratio (W/P) of the width (W) of the inter-pit groove to the track pitch (P) is from 0.2 to 0.4.

9. An optical information recording medium comprising:
   a ROM region in which intermittent pits are formed along a line at a track pitch (P) and including an inter-pit groove connecting adjacent pits along the line; and
   a RAM region including a groove in which at least one of a pit and a mark is to be formed to record information,
   wherein a width (W) of the inter-pit groove is narrower than a width of the groove in the RAM region.

10. The optical information recording medium according to claim 9, wherein a ratio (W/P) of the width (W) of the inter-pit groove to the track pitch (P) is from 0.2 to 0.4.

11. The optical information recording medium according to claim 9, wherein the optical information recording medium is a CD-R.

12. The optical information recording medium according to claim 9, wherein the optical information recording medium is a CD-RW.

13. An information recording method comprising:
   providing an optical information recording medium comprising a RAM region including a groove, and a ROM region in which intermittent pits are formed along a line at a track pitch (P) and including an inter-pit groove connecting adjacent pits along the line; and
   forming at least one of a pit and a mark in the groove in the RAM region of the optical information recording medium to record information,
   wherein a width (W) of the inter-pit groove is narrower than a width of the groove in the RAM region.

14. The information recording method according to claim 13, wherein a ratio (W/P) of the width (W) of the inter-pit groove to the track pitch (P) is from 0.2 to 0.4.

15. An optical information recording method comprising:
   providing an optical information recording medium comprising a RAM region including a groove, and a ROM region in which intermittent pits are formed at a track pitch (P) and including an inter-pit groove connecting adjacent pits along the line; and
   applying light irradiation to the groove in the RAM region of the optical information recording medium to form at least one of a pit and a mark therein,
   wherein a width (W) of the inter-pit groove is narrower than a width of the groove in the RAM region.

16. The optical information recording method according to claim 15, wherein a ratio (W/P) of the width (W) of the inter-pit groove to the track pitch (P) is from 0.2 to 0.4.

* * * * *